United States Patent
Sarnoff

(10) Patent No.: US 6,293,458 B1
(45) Date of Patent: Sep. 25, 2001

(54) DISPOSABLE FOIL PAN

(75) Inventor: Norton Sarnoff, Northbrook, IL (US)

(73) Assignee: Handi-Foil Corporation, Wheeling, IL (US)

( * ) Notice: Subject to any disclaimer, the term of this patent is extended or adjusted under 35 U.S.C. 154(b) by 0 days.

(21) Appl. No.: 09/345,067

(22) Filed: Jun. 30, 1999

(51) Int. Cl.[7] .................................................. B65D 3/00
(52) U.S. Cl. ........................ 229/5.82; 220/912; 220/671; 220/573.1
(58) Field of Search ................................... 220/912, 671, 220/573.1; 229/5.82, 407, 5.81; D9/424, 425

(56) References Cited

U.S. PATENT DOCUMENTS

| | | | |
|---|---|---|---|
| Re. 7,752 | * | 6/1877 | Gilbert ................................. 220/671 |
| Re. 33,447 | * | 11/1990 | Rosman ........................... 229/5.82 X |
| D. 312,024 | * | 9/1963 | Antoni et al. .......................... D9/425 |
| D. 352,454 | * | 11/1994 | Krupa .................................... D9/425 |
| D. 381,560 | * | 9/1963 | Indekeu ................................. D7/538 |
| D. 392,881 | * | 3/1998 | Bulcher et al. ........................ D9/425 |
| D. 409,909 | * | 5/1999 | Hayes et al. .......................... D9/429 |
| 685,832 | * | 11/1901 | Gender ................................. 220/671 |
| 3,104,776 | * | 9/1963 | Bostrom ............................... 220/671 |
| 3,545,645 | * | 12/1970 | Smith ............................... 220/671 X |
| 4,616,762 | * | 10/1986 | Alexander ............................ 220/912 |
| 5,040,698 | * | 8/1991 | Ramsey et al. ...................... 220/671 |
| 5,048,707 | * | 9/1991 | Hallberg ........................... 220/671 X |
| 6,012,628 | * | 1/2000 | Shaikh et al. ..................... 229/103.2 |
| 6,065,629 | * | 5/2000 | Sarnoff et al. ....................... 220/315 |
| 6,102,280 | * | 3/1998 | Dowd .................................. 229/155 |

* cited by examiner

Primary Examiner—Allan N. Shoap
Assistant Examiner—Tri M. Mai
(74) Attorney, Agent, or Firm—Robert F. I. Conte; Lee, Mann, Smith, McWilliams, Sweeney & Ohlson

(57) ABSTRACT

This invention relates to a disposable foil pan having a continuous wall and a top ridge surrounding the pan. The wall has at least 10 spaced wall segmented flutes. There are preferably an equal number of segmented flutes on opposite sides of the pan i.e. 3 on each side and 2 on each end of a rectangular or oval pan. The wall segmented flutes having a combined width equal to at least 35% of the length of the wall. Each wall segmented flute has an indented surface facing an inside of the pan, and a raised surface forming the outer wall of the pan. The segmented flutes preferably have a segment length of 0.75 to 2.0 inches and a segmented depth of about 1/8 to 3/8 inches.

8 Claims, 4 Drawing Sheets

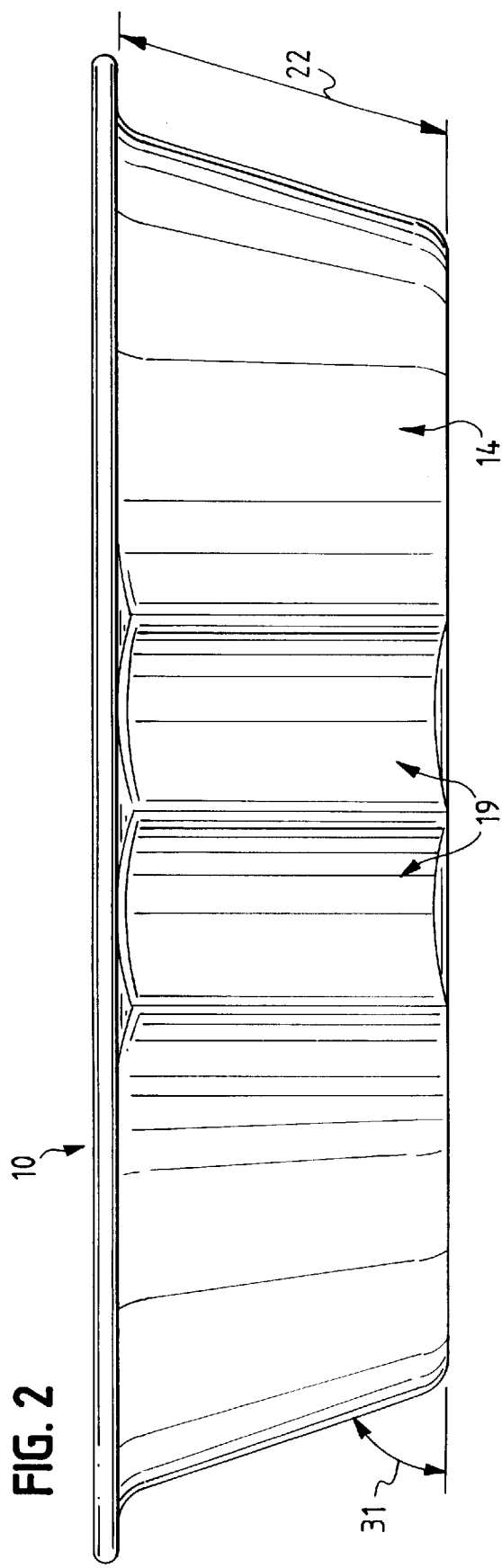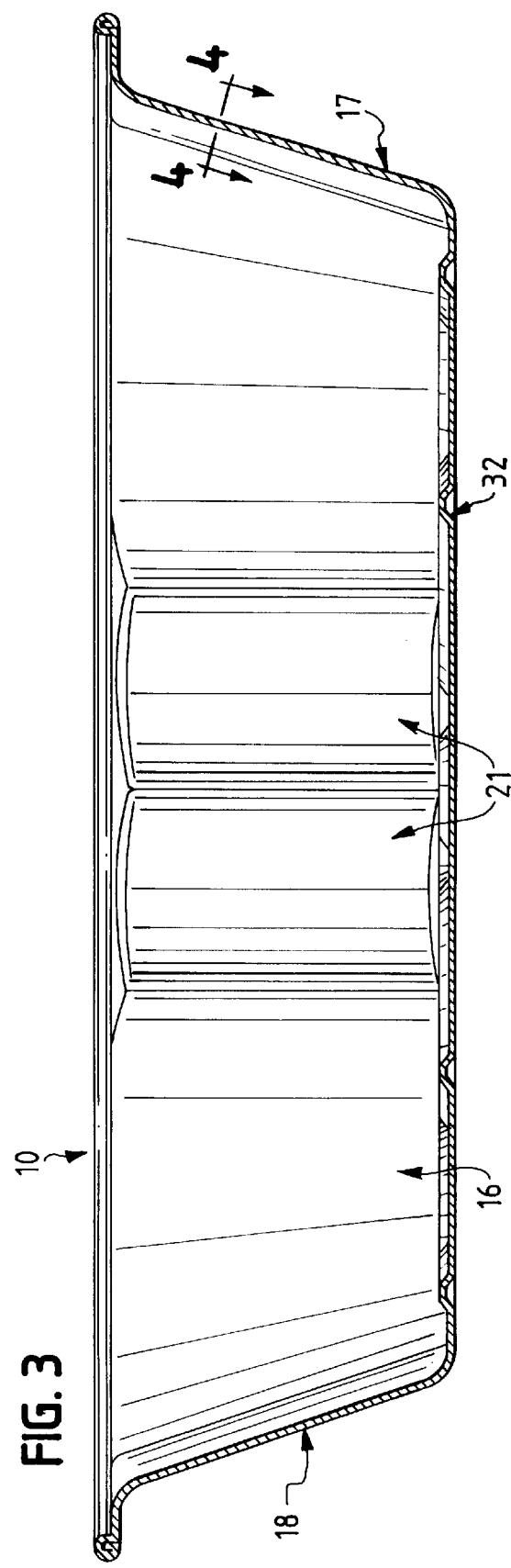

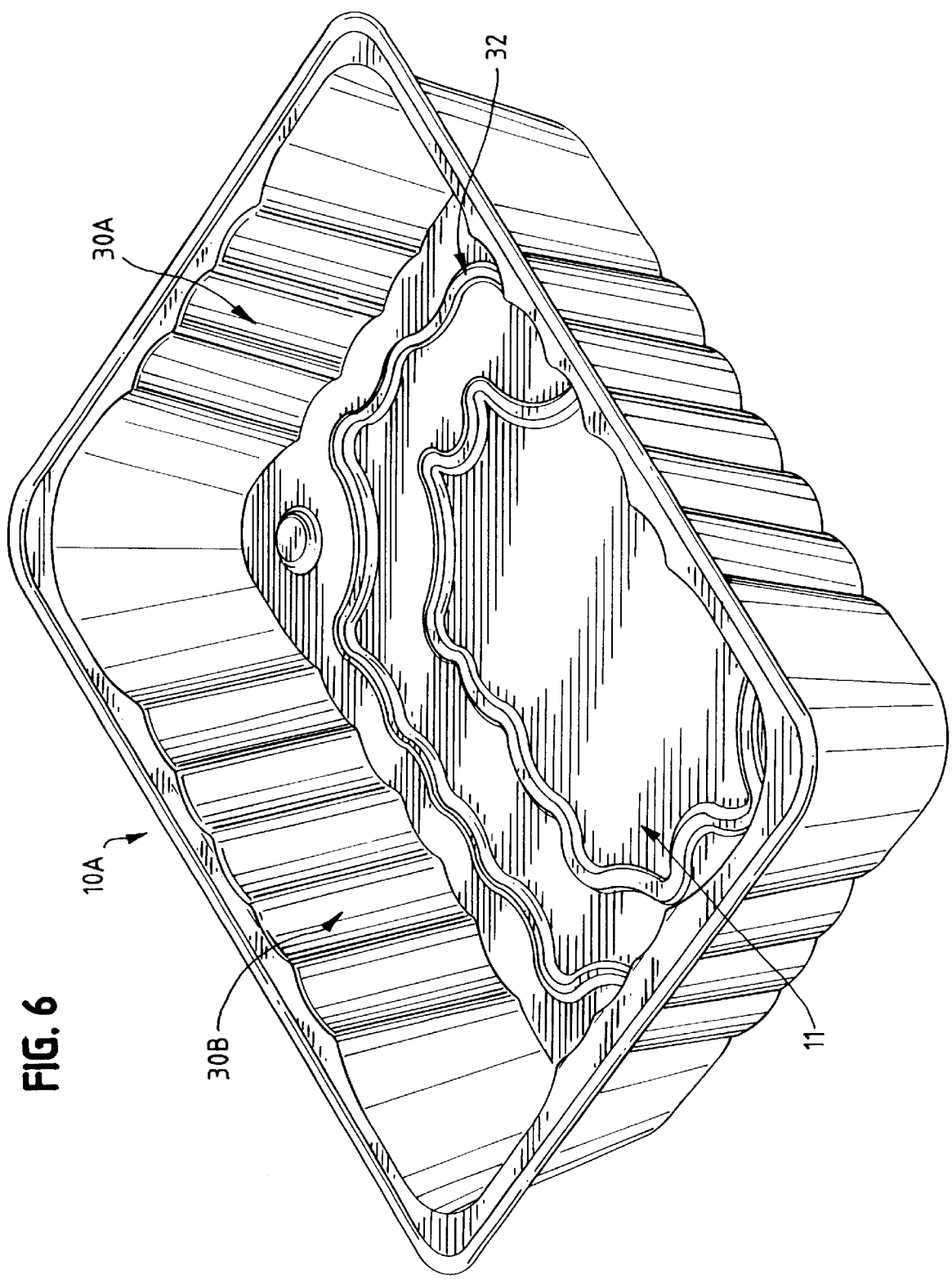

DISPOSABLE FOIL PAN

The present invention relates to a disposable foil pan which can be used for holding and cooking relatively heavy items without having the sides of the pan collapse. More particularly the present invention relates to a one-piece disposable aluminum foil roasting pan for relatively large items such as hams, turkeys, chickens and having inclined sides and end walls each formed of at least two large segmented tubular strengthening flutes.

BACKGROUND OF THE INVENTION

Aluminum foil pans are used for cooking, baking and roasting since they are efficient in quickly distributing heat and are also relatively inexpensive thus, making them disposable. A wide variety of shapes and sizes of aluminum foil pans have been built and developed. Generally the roasting pans for roasting are rectangle, oval or square in shape. Also various types of formations such as ribs are typically provided in the side and end walls of the pans. Typical of these ribs are shown and U.S. Pat. Nos. 4,717,038; 3,958,504; and 4,616,762. In these pans it has been found that the ribs are not sufficient to prevent the side walls from collapsing when someone inadvertently tries to pick up the pan by either the ends or sides. Therefore it would be desirable to have a roasting pan which has better strength than the typical aluminum foil roasting pan.

SUMMARY OF THE INVENTION

In accordance with the present invention I provide a disposable foil pan having side and end walls and a top ridge surrounding the pan. Each of the end walls has at least two end wall segmented flutes that have a combined width equal to at least 30% of the length of each end wall. The end wall segmented flutes have a concave surface facing an inside of the pan and a convex surface forming an outer end wall of the pan. Each of the side walls have at least three side wall segmented flutes. The side wall segmented flutes have a combined width equal to at least 40% of the length of each side wall. The side wall segmented flute also have a concave surface facing the inside of the pan and a convex surface forming an outer side wall of the pan.

Another object of the present invention is to provide a one-piece disposable aluminum foil pan i.e. roasting pan having inclined side and end walls inclined at 60° to 90° and a top ridge surrounding the pan with a rolled-over bead at the end of the ridge. In some uses, the rolled-over bead only partially surrounds the ridge. Each of the end walls has at least two end wall segmented tubular flutes. The end wall segmented tubular flutes extend the width of the end wall, and have a combined width equal to at least 30% of the length of each end wall. Each end wall segmented tubular flute having a concave surface facing an inside of said pan and a convex surface forming an outer inclined wall of the pan. Each end wall segmented tubular flute has an end wall inner and outer radius, that are the same throughout the length of the end wall flute. The end wall flute defines a segmented arc that extends for 30–90°, has a radius of about 0.625 to 2.25 inches, and a depth of about ⅛ to ⅜ inches. The pan side walls having at least three side wall segmented tubular flutes, which are preferably the same as the end wall segmented flutes. The side wall segmented tubular flutes have a combined width equal to at least 40% of the length of each side wall.

Further objects, features, and advantages of the present invention will become more apparent from the following description and drawings.

BRIEF DESCRIPTION OF THE DRAWINGS

FIG. 2 is a left plain view of the disposable foil pan of FIG. 1.

FIG. 3 is a cross-sectional view taken along line 3—3 of FIG. 1.

FIG. 6 is a top view of the pan of FIG. 5.

DETAILED DESCRIPTION OF THE INVENTION

Figure 1:
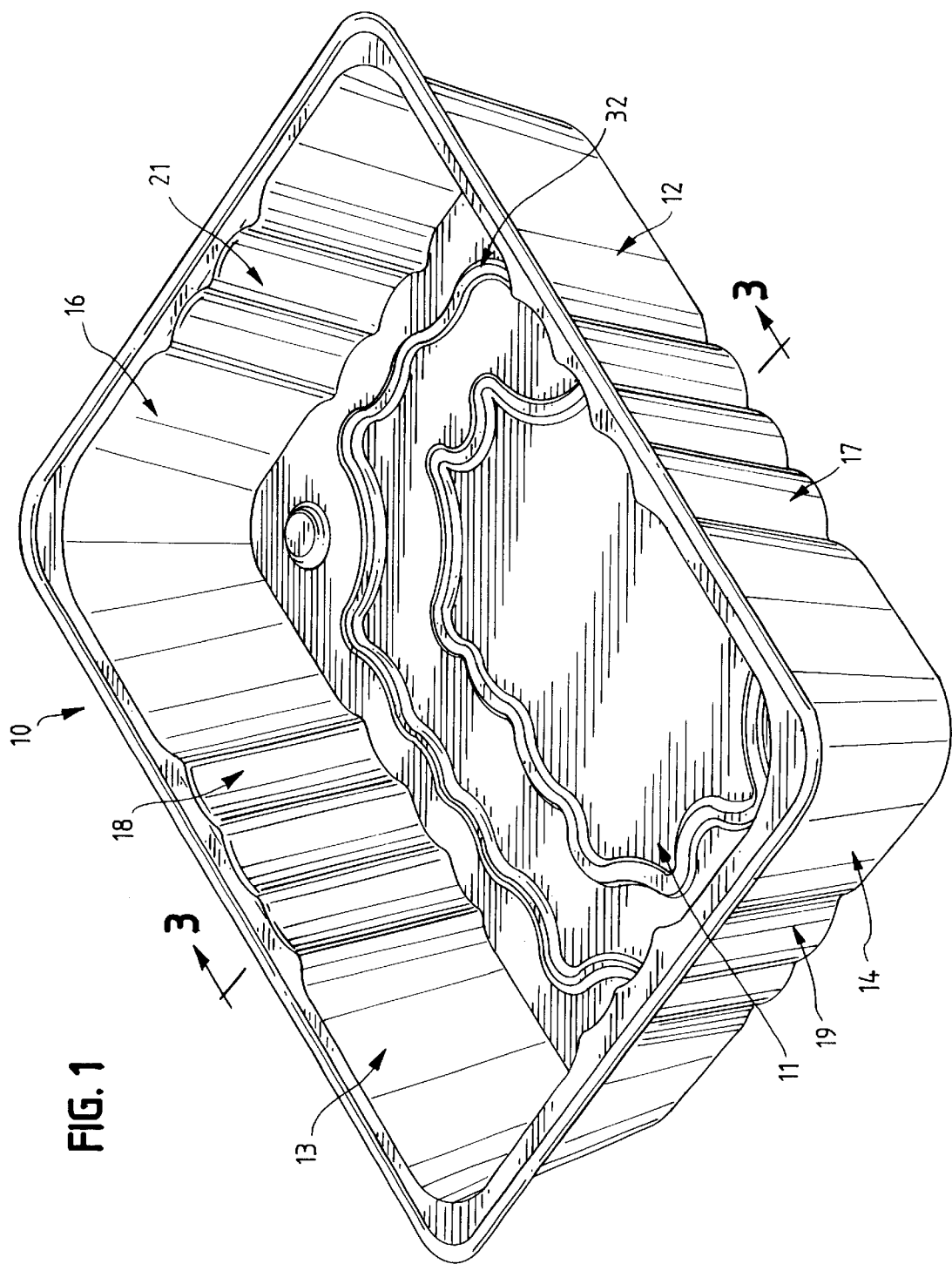
FIG. 1 is a top perspective view of a disposable foil pan of my invention.

Referring to FIGS. 1–3 there is illustrated a disposable foil pan 10. The disposable foil pan 10 is preferably a one-piece thin gauge stamped aluminum foil. The pan 10 has a bottom wall 11, and a continuous wall made up of two side walls 12 and 13, and two end walls 14 and 16. The pan has three segmented tubular flutes 17 forming the side wall 12 and three segmented tubular flutes 18 forming the side wall 13. The pan has two segmented tubular flutes 19 forming the end wall 14 and two segmented tubular flutes 21 forming the end wall 16. The segmented tubular flutes 17,18,19 and 21 are preferably segmented tubes joined at their segmented ends. The side wall segmented tubes 17 and 18 are preferably identical and extend the width 22 of the side walls 12 and 13 and each has a side wall inner and outer radius. The end wall segmented tubes 19 and 21 and each has an end wall inner and outer radius and also are preferably identical to each other and identical to the side wall segmented tubes and have a length equal to the side wall width 22. Although the segmented flutes are described as being segmented tubes, they may be of any shape having an indented and a protruding surface. An alternative would be a hollow segmented frustro-cone, or a segmented box shape.

Figure 4:
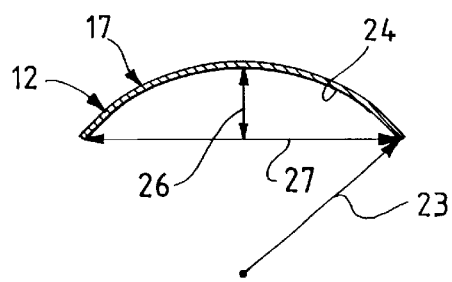
FIG. 4 is a partial cross-sectional view taken along lines 4—4 of FIG. 3.

When referring to FIG. 4, the segmented tubular flute 12 has an inner radius 23, an inner arc 24, a depth 26, and an inner segment length 27. The arc 24 extends for 30° to 90° and preferably extends for 45° to 75°. The width 22 of the side end walls is preferably 1.0 to 5 inches for my pan and more preferably 1.5 to 4.5 inches. When the width 22 is 1.0 to 5 inches, the radius 23 is 0.625 to 2.25 inches and preferably 1.25 to 1.75 inches, and the depth 26 is ⅛ to ⅜ inches and preferably ³⁄₁₆ to ⁵⁄₁₆ inches, and the segmented length 27 is 0.75 to 2 inches and preferably 1.0 to 1 ⅝ inches.

When referring to FIG.2, the walls of the pan 10 incline at an angle 31 equal to 60 to 90° and preferably 70 to 80°.

As shown in FIGS. 1 and 3, the bottom wall 11 has a contoured design 32 that is raised on the bottom inner surface of the bottom wall and indented on the bottom outer surface of the bottom wall.

The pans that use my invention are those that have a rectangular, oval or square shape. The base of the pans have a central longitudinal dimension or length of 6 to 20 inches. This is indicated as 28 for my pan 10A in FIG. 5. The base has a transverse dimension or width of 4 to 18 inches. This is indicated as 29 in my FIG. 5.

My disposable foil pan has as many as twenty-four (24) end wall segmented tubular flutes and as many as twenty-seven (27) side wall segmented tubular flutes on a 18×20 inch aluminum foil roasting pan.

Figure 5:
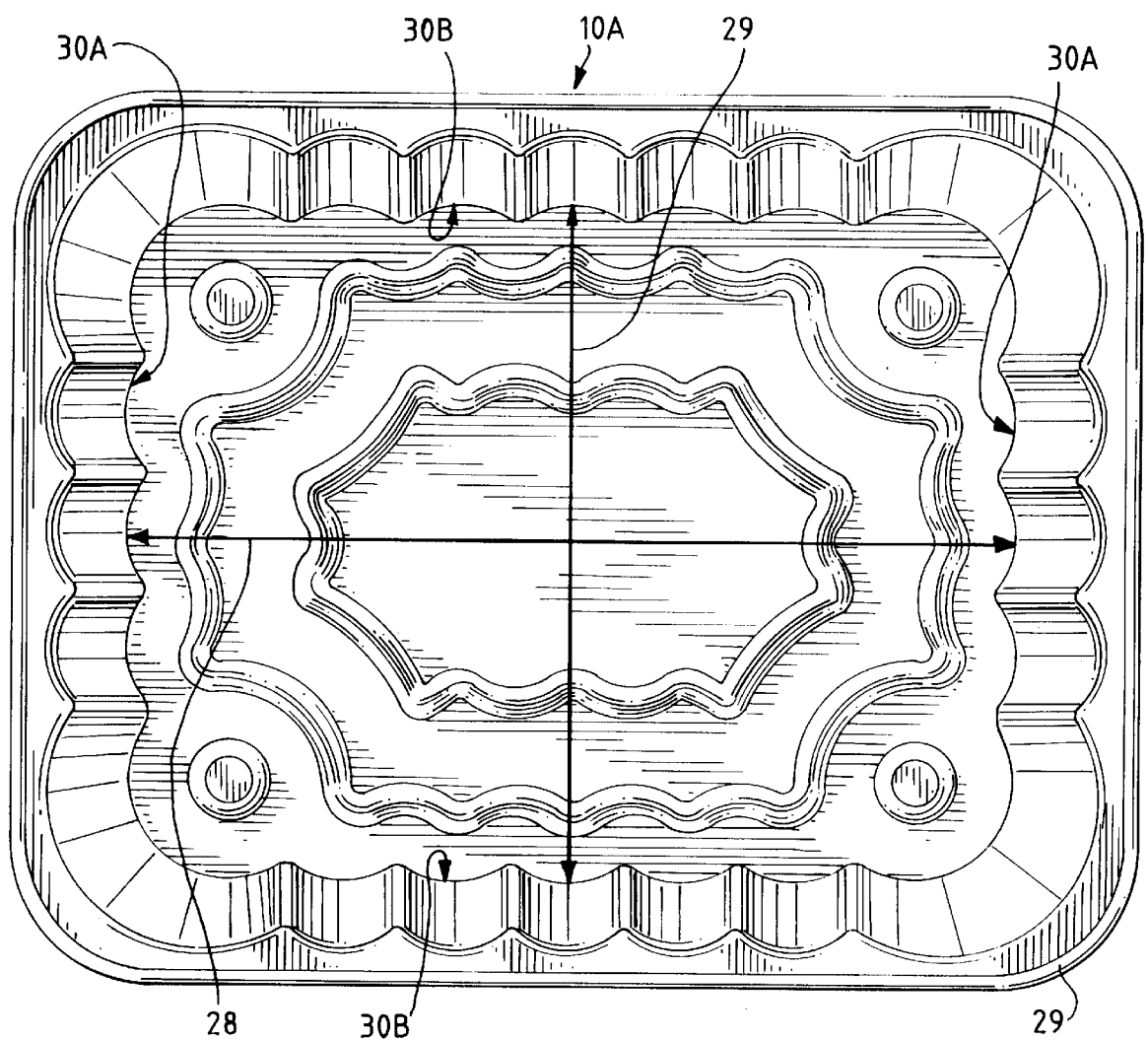
FIG. 5 is the top plain view of another disposable foil pan of my invention.

FIGS. 5 and 6 illustrates a disposable foil pan 10A having 3 complete end wall segmented tubes 30A and 5 complete side wall segmented tubes 30B. The segmented tubes 30A and 30B are identical to each other. The remaining portions of this pan uses numbers the same as FIGS. 1–3 to identify the same portions in the pan 10A as were identified in the pan 10.

The relatively large flutes of my invention gives stability to the sides and ends of my disposable metal foil pan. It is of course understood that although I show only rectangular pans in FIGS. 1 to 6, my pan also includes the popular oval shape. In that instance, the end walls have an arcuate shape.

It will become apparent to those skilled in the art that changes and modifications may be made in the foregoing without departing from the spirit of the invention, the scope of which is defined by the appended claims.

I claim:

1. A disposable aluminum foil roasting pan having inclined side and end walls, a top ridge surrounding said pan and a rolled-over bead at the end of said ridge, comprising:

each of said end walls having at least two end wall segmented tubular flutes, each of said end wall segmented tubular flutes extending the width of the end wall, said at least two end wall segmented tubular flutes having a combined width equal to at least 30% of the length of each end wall, each end wall segmented tubular flute having a concave surface facing an inside of said pan, each end wall segmented tubular flute having a convex surface forming an outer wall of the pan, each end wall segmented tubular flute has an end wall inner and outer radius, the end wall inner and outer radius of each flute being the same throughout the length of the end wall flute, a segmented arc of each end wall segmented tubular flute extends for 30–90°, each end wall segmented arc has a radius of about 0.625 to 2.25 inches, each end wall segmented tubular flute has a segmented depth of about 1/8 to 3/8 inches, said end wall segmented arc having a segmented length of 0.75 to 2.0 inches, each of said side walls having at least three side wall segmented tubular flutes, each of said side wall segmented tubular flutes extending the width of the side wall, said at least three side wall segmented tubular flutes having a combined width equal to at least 40% of the length of each side wall, each side wall segmented tubular flute having a concave surface facing the inside of said pan, each side wall segmented tubular flute having a convex surface forming an outer side wall of the pan, each side wall segmented tubular flute has a side wall inner and outer radius, the side wall inner and outer radius of each side wall flute being the same throughout the length of the side wall flute, a segmented arc of each side wall segmented tubular flute extends for 30–90°, each side wall segmented arc has a radius of about 0.625 to 2.25 inches, each side wall segmented arc has a segmented depth about 1/8 to 3/8 inches, and each side wall segmented arc has a segmented length of 0.75 to 2.0 inches.

2. The one-piece disposable aluminum foil roasting pan of claim 1 wherein said at least two end wall segmented tubular flutes have a combined width for each end wall equal to at least 60% of the length of one end wall, the segmented arc of each end wall segmented tubular flute extends for 45 to 75°, the depth of each end wall segmented tubular flute are about 3/16 to 5/16 inches, and the segmented length of each end wall segmented tubular flute is 1.0 to 1 5/8 inches.

3. The one-piece disposable aluminum foil pan of claim 2 wherein, said pan is a 4 by 6 to an 18 to 20 inch aluminum foil pan, the width of each end and side wall is 1 to 5 inches, each of said side walls have at least 4 side wall segmented tubular flutes, and each of said end walls have at least 2 end wall segmented tubular flutes.

4. The one-piece disposable aluminum foil pan of claim 3 wherein, each side wall has 5 complete side wall segmented tubular flutes, and each end wall has 3 complete end wall segmented tubular flutes.

5. A disposable foil pan made of aluminum having a continuous side and end walls and a top ridge surrounding said pan comprising:

said wall having at least ten spaced segmented tubular flutes surrounding said pan, said segmented flutes have a combined width equal to at least 60% of the length of said wall, each segmented tubular flute having an indented surface facing an inside of said pan, each segmented tubular flute having a raised surface forming an outer wall of the pan, a segmented arc of each segmented tubular flute extends for 30 to 90°, a depth of each segmented arc is about 1/8 to 3/8 inches and a segmented length of each end wall segmented tubular flute is 0.75 to 2.0 inches.

6. The disposable foil pan of claim 5 wherein, the segmented arc of each end wall segmented tubular flute extends for 45 to 75°, the depth of each segmented arc is about 3/16 to 5/16 inches, the length of each segmented arc is 1.0 to 1 5/8 inches.

7. The disposable foil pan of claim 6 wherein, said pan has a rectangular shape with two opposite side walls and two opposite end walls, the width of each end and side wall is 1 to 5 inches, each of said walls have 4 to 7 side wall segmented tubular flutes, and each of said end walls have 2 to 4 end wall segmented tubular flutes.

8. The disposable foil pan of claim 7 wherein, each side wall has 5 complete side wall segmented tubular flutes, and each end wall has 3 complete end wall segmented tubular flutes.

* * * * *